No. 813,386. PATENTED FEB. 20, 1906.
F. KRÄMER.
HOOK FOR CHAINS.
APPLICATION FILED SEPT. 6, 1905.
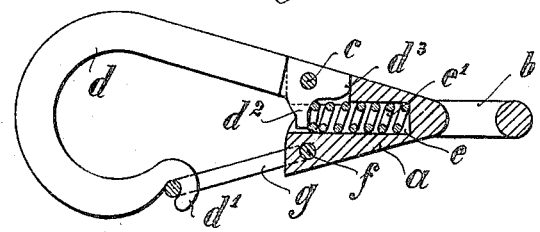
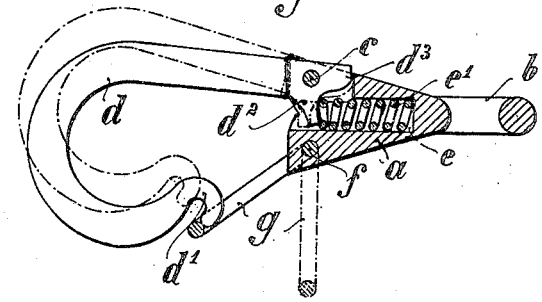
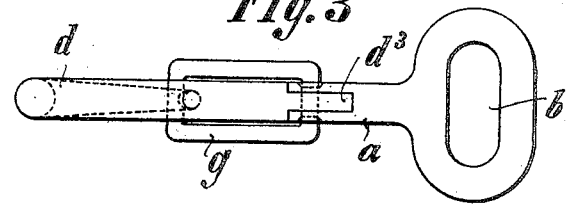
Witnesses:
Inventor:
Friedrich Krämer

UNITED STATES PATENT OFFICE.

FRIEDRICH KRÄMER, OF GRÜNE, NEAR ISERLOHN, GERMANY, ASSIGNOR TO THE FIRM OF HEINRICH WILKE, OF GRÜNE, NEAR ISERLOHN, GERMANY.

HOOK FOR CHAINS.

No. 813,386.     Specification of Letters Patent.     Patented Feb. 20, 1906.

Application filed September 6, 1905. Serial No. 277,250.

*To all whom it may concern:*

Be it known that I, FRIEDRICH KRÄMER, a citizen of the German Empire, residing at Grüne, near Iserlohn, in the Province of Westphalia and Kingdom of Prussia, Germany, have invented certain new and useful Improvements in Hooks for Chains, of which the following is a specification.

This invention relates to improvements in hooks for chains used principally for agricultural purposes—for chaining cattle, for instance; and the gist of the invention consists in a locking device for the hook which is based on the action of a toggle-joint, or, in other words, that the hook is composed of two main parts which are so connected that when a pulling strain is exerted upon them a third or locking piece or a safety-link fixed to one of them may be so jointed to the other piece that the opening of the hook cannot be effected without overcoming a certain amount of force, and this in such a manner that the cattle cannot undo or loosen themselves from the chain, while an arbitrary opening of the hook is almost absolutely excluded. A spring is applied in a suitable manner, securing the hook in its closed position and tending to bring it back or holding it into the position for hindering the locking-link from falling out of the hook when no strain is exerted upon the chain.

In the accompanying drawings, Figure 1 represents a side elevation of a safety-hook embodying my invention, the part $a$ being in longitudinal vertical central section, showing the hole $e$ and spring $e'$, the device being shown in its locked position. Fig. 2 is a similar view of the same in its unlocking or opening position, the full-open position of the parts being shown in dotted lines. Fig. 3 is a top view of the same as shown in Fig. 1.

The new hook is composed of the two main pieces $a$ and $d$ and of a link $g$. The pieces $a$ and $d$ are hinged together by a pin $c$, so as to allow the hook-shaped piece $d$ to swing on the piece $a$ on the pin $c$ a certain amount. The link $g$ is also fitted pivotally to the piece $a$ at a point $f$, so as to be able to be passed over the counter-hook $d'$, formed at the open end of the hook $d$. The part $a$ is provided with an eye $b$ at its rear end, to which the chain is connected. At the opposite side—that is, at the side facing the hook $d$—a hole $e$ is bored into the piece $a$ and a spiral spring $e'$ is placed into said boring. The hook $d$ is also provided with a nose $d^2$, projecting downwardly and reaching into the boring $e$, so that the spring $e'$ has the tendency to press the hook $d$ outward, as indicated in dotted lines in Fig. 2—that is, into a similar position as a pulling strain exerted upon the hook will do—the rearward projection $d^3$ of the hook hindering a too wide opening of the same, as will be seen by Fig. 1.

From the description given so far and from Figs. 1 and 2 it will now be easily understood that when the hook $d$ is pressed down into the position shown in full lines in Fig. 2 the link $g$ may be thrown into or out of the counter-hook $d'$ and that as soon as this pressure upon the hook is released the latter is pressed back by the action of the spring $e'$ upon the nose $d^2$ into the position shown in Fig. 1, thereby locking the link $g$ fast by the counter-hook $d'$ so that it cannot be withdrawn from it by itself, and it will further be observed that a pulling strain exerted upon the eye $b$ and the hook $d$ in opposite directions will secure the locking of the link $g$ or the closing of the opening of the hook. Of course care has to be taken that the inner length or width of the link $g$ will be so proportioned that when the position shown in Fig. 1 is reached—that is, when the hook is in its locked or extended position—and the part $d^3$ is in contact with the opposite wall of part $a$ it will just reach from the pivot-point $f$ to the point of engagement with the inner side of the counter-hook $d'$.

Having thus described my invention, what I claim as new, and desire to secure by Letters Patent, is—

1. In a safety-hook, a shank-piece $a$, having a longitudinal recess $e$ in its forward end and a spiral spring $e'$ in said recess, in combination with a hook $d$ pivoted to said piece $a$, a counter-hook $d'$ at the free end of hook $d$, a lug or shoulder $d^2$ of said hook engaging spring $e'$, a rearward projection $d^3$ of hook $d$ engaging the shank-piece $a$ to prevent the hook $d$ from opening more than the distance necessary to securely lock the same and means directly and detachably connecting the said counter-hook to the said shank-piece, substantially as and for the purpose set forth.

2. In a safety-hook, a shank-piece $a$, a recess $e$ bored in the forward end thereof, a spring $e'$ in said recess, a hook $d$ pivoted to said shank-piece $a$, a counter-hook $d'$ on the free end of said hook and a projection $d^2$ of said hook $d$ bearing against said spring, in combination with a link $g$ pivoted to the shank-piece $a$ and adapted to engage the said counter-hook so as to lock the hook securely, substantially as set forth.

In testimony whereof I have affixed my signature in presence of two witnesses.

FRIEDRICH KRÄMER.

Witnesses:
 OTTO KÖNIG,
 KARL HEMSING.